Patented Apr. 11, 1939

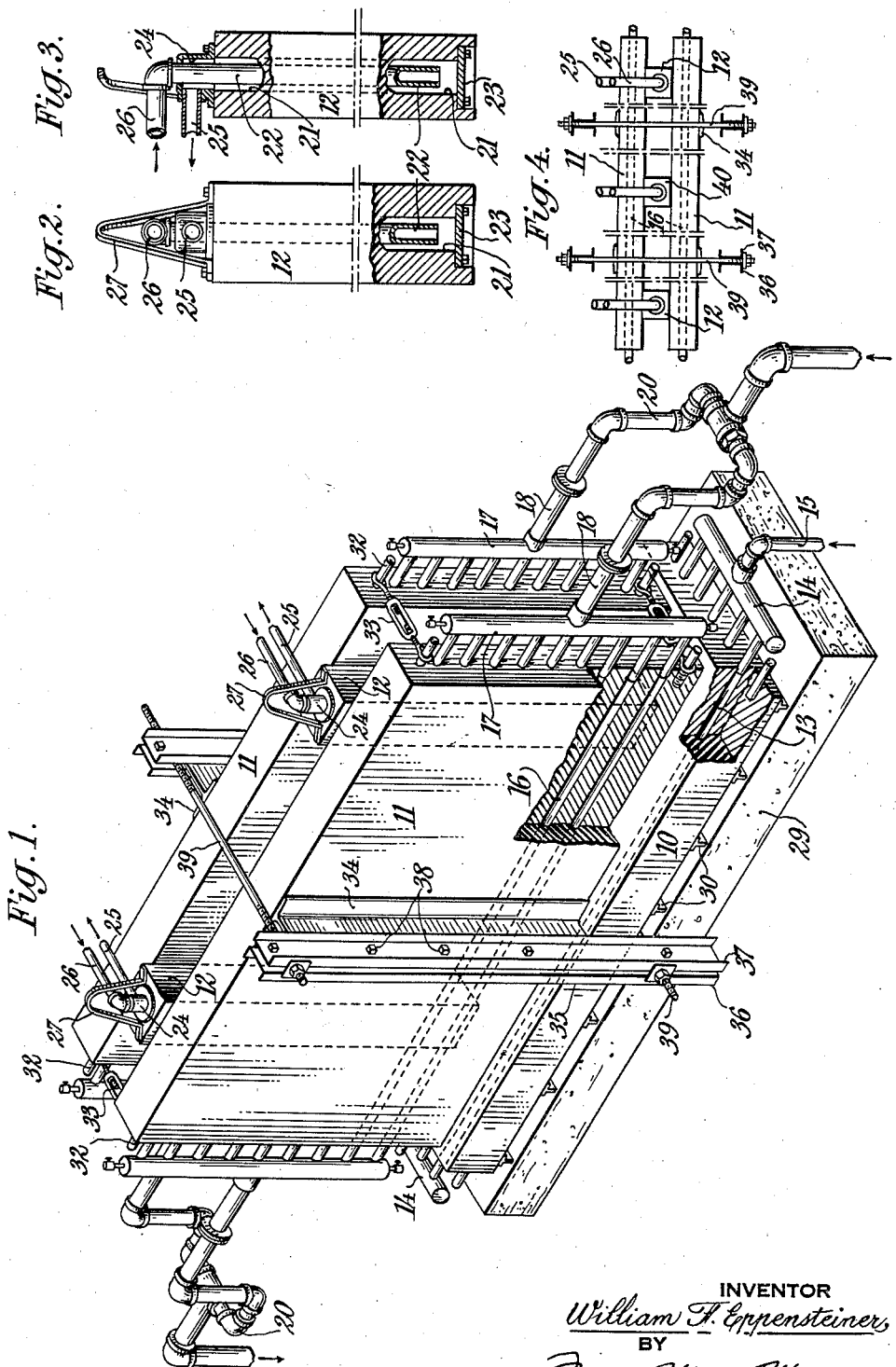

2,154,234

UNITED STATES PATENT OFFICE 2,154,234

ADJUSTABLE MOLD

William F. Eppensteiner, Rahway, N. J., assignor to The American Metal Company, Limited, New York, N. Y., a corporation of New York Application July 28, 1936, Serial No. 92,960

5 Claims. (Cl. 22—212)

The present invention relates to molds for casting copper cakes and the like, and more particularly to an adjustable mold for casting such cakes of different sizes, which, at times, measure 90″ x 60″ x 20″, weighing over 30,000 lbs., and to the method of casting such cakes.

In casting copper cakes it is desirable to cast the metal in vertical water-cooled molds in order to obtain smooth surfaces with a minimum area of "set side" in the cast cake whereby the cake will better withstand wear and better lend itself to rolling operations where the cast cake is intended for such use. Heretofore individual water-cooled molds had to be provided for each particular size of casting. This necessitated a large investment in molds and considerable storage facilities. Also special size cakes are occasionally required for particular needs, and in the absence of a mold of the desired dimensions, a larger cake must be cast and cut down.

Furthermore, in casting large size smooth surfaced copper cakes and the like, the quantity of heat involved is so great that the blocks forming the mold walls expand considerably notwithstanding they are water-cooled. This expansion causes the walls of the mold to move away from the partially solidified cake and produce air spaces between the cake and the walls. While the cake is solidifying and just before the last part of the copper solidifies, the internal pressure in the remaining liquid metal becomes so great that the liquid copper is forced between the crystals of the surface and fills the spaces between the cake and the mold walls and produces what is known as "sweat", which, upon solidifying, gives to the cake a rough instead of a smooth surface.

Accordingly the primary object of my invention is to provide a casting mold, the walls of which are adjustable relatively to each other to vary the size of the mold space. A further object is to provide such mold, the walls of which have fluid circulating passages therein through which cooling fluid may flow for rapidly cooling the casting. A further object is to provide such walls with opposite flat faces so that either face thereof may serve as a boundary for the mold space and thus render the individual walls reversible and interchangeable. A further object is to provide the mold with adjustable holding or tensioning means which can be tightened as soon as the metal is poured in order to take up the expansion of the walls and thereby eliminate the air spaces between the cake and the mold walls, which otherwise would be present. A further object is to provide a novel method of casting large size copper cakes with smooth surfaces.

To these ends my invention contemplates the provision of an adjustable mold comprising independently formed bed, side wall and end wall elements or blocks each provided with plane, preferably parallel, surfaces adapted to seat flush against or upon one another, and means for holding said mold elements in assembled relation and for taking up or tensioning such holding means to prevent the formation of sweating on the walls of the cake. Where the cakes to be cast are large, that is, those having large face areas, means for preventing the bulging or buckling of the side walls of the molds intermediate the ends thereof during casting will preferably also be employed and these means will likewise be adapted for taking up or tensioning to prevent sweating of the cakes.

The invention will be better understood from the detailed description which follows, when considered in conjunction with the accompanying drawing, wherein:

Figure 1 is a perspective view of adjustable mold embodying my invention, parts thereof being broken away to show the water circulating passages through the various mold wall elements.

Fig. 2 is a front elevation of an end block element of the mold, parts thereof being broken away to show the water circulating passages therein.

Fig. 3 is a view similar to Fig. 2 taken at right angles thereto.

Fig. 4 is a diagrammatic top plan view of a modified form of the invention.

Referring first to Figs. 1 to 3 of the drawing, the adjustable mold may be said to consist of a bed block 10, two side blocks 11 and two end blocks 12, preferably made of copper, the side and end blocks being mounted on the bed block with the end blocks adjustably mounted between the side blocks.

Preferably the bed block 10 and each of the side blocks 11 are in the form of a flat, parallelepiped, each face of which is a rectangle. The bed block 10 intermediate the parallel flat faces thereof has extending therethrough a plurality of parallel longitudinal passages 13 through which cooling fluid, usually water, may circulate. To facilitate the flow of such cooling fluid through said block, the passages 13 are connected at each end with a distributor header 14 provided with a single ingress or egress pipe 15. The branch tubes of the headers 14 may be secured within the openings 13 in any approved manner to provide leak-tight joints therewith or may pass entirely through the block, the metal being cast around the tubes. The side blocks 11 are similarly provided with longitudinally-extending passages 16 and headers 17, which latter are each provided with ingress or egress pipes 18. Where it is desired to supply the cooling fluid to both side block headers 17 from a single source, suitable connections, comprising unions, couplings, elbows or other fittings, generally indicated by the reference character 20, may be employed.

The end blocks 12 are also each of rectangular prism or parallelepiped form and have fluid circulating passages therein provided by a central bore 21, within which is concentrically mounted a tube 22. As herein shown, the bore passage 21 extends completely through the end block and is closed off at its bottom end by an inset closure plate 23, and provided at its top end by a cap fitting 24 from which laterally extends a pipe 25. The tube 22 extends through an opening in the top of the cap fitting 24 which serves to center said tube, which projects down into the bore 21 to a point above the closure plate to provide a communicating passage between the tube and said block bore at the bottom of the block. At its top the tube 21 is fitted with a connecting pipe 26. As shown by the arrows in Figs. 1 and 3, the pipe 26 may constitute an ingress pipe for the cooling fluid, while the pipe 25 provides an egress for the cooling fluid. To facilitate the handling of the end blocks 12 so as to adjustably position them between the side blocks 11, the end blocks are each fitted at their top with a bail or the like 27.

The adjustable mold is preferably mounted upon a concrete or the like base so as to preserve the flat surface contour of the bottom face of the bed block, and, as herein shown, the base support is in the form of a rectangular block of concrete or the like 29, preferably of slightly larger area than the bed block, and has extending upwardly from the top face thereof a plurality of transverse supports 30 which may be in the form of I-beams, parts of which are embedded in the concrete block. By mounting the bed block on these beams an air space will be provided between the bottom face of the bed block and the base support, which will aid in the dissipation of heat and also provide a space for clamping means, which will be presently described.

For holding the mold elements in assembled relation to provide a mold space of desired size, the side blocks 11 are each provided at their opposite ends with outwardly-extending pins or lugs 32 adjacent their top and bottom, which pins are adapted to accommodate suitable clamping or tensioning elements, herein shown as turnbuckles 33. Where a large size block is to be cast, that is, where the face area of the block is of considerable width, it is desirable in order to insure substantially uniform thickness for the casting and to prevent bulging or buckling of the side blocks, I provide reinforcing means thereagainst at suitably located distances intermediate their ends. I have herein shown one set of these reinforcing means which comprises a pair of battens 34 each of which may be in the nature of a T-beam or the like, the head of which engages the outer face of the block and the web of which is carried by upright supports 35, herein shown as consisting of a pair of oppositely-directed channel beams 36 and 37, between which the web of the batten 34 is held by bolts or other securing means 38. The length of the battens 34 is preferably equal to the height of the side blocks 11 so that suitable clamping means may be extended both above and below the side blocks to clamp said battens in position thereon. The clamping means, as herein disclosed, are in the form of tension rods 39, the opposite ends of which are threaded and extend through the spaces between the channels 36 and 37 of the members 35, and upon the ends of which tension members clamping nuts and washers are applied for bearing against said channel members 35. The lower tension rod 39, it will be noted, extends through the space between the under face of the bed block 10 and the top surface of the base 29. Of course, the engaging relation between the battens 34 and the channel members 35 will be predetermined by the width of the base 29 and the thickness of the cake to be cast, as controlled by the width or thickness of the end block 12.

When it is desired to cast a copper cake of predetermined dimensions, and particularly of predetermined width and thickness, the adjustable mold is set up to provide a mold space of said desired dimensions by choosing end blocks which will provide the proper thickness for the mold space and positioning such end blocks a proper distance apart between the side blocks 11. The blocks all having smooth flat faces, intimate contact engagement therebetween will be readily obtained. The weights of the side blocks and end blocks themselves will be sufficient to provide a suitable liquid metal seal with the top face of the bed block, and the clamping means 33 to 39 will insure perfect contact between the faces of the side and end blocks and prevent buckling of the side blocks intermediate their ends. Suitable connections will then be made with the ingress and egress ducts leading to the various mold elements so that cooling fluid may be circulated through the passages in the various blocks by the means hereinbefore described. The rate of flow of the cooling fluid, can, of course, be regulated at will to provide for a rate of cooling which will bear a relationship to the size of cake being cast and the character of crystalline structure desired in the casting.

In casting large cakes the quantity of heat involved is considerable, and although the mold walls are water-cooled they expand considerably, and in so doing move away from the partially solidified cake and produce air spaces between the cake and the walls. The formation of these air spaces gives rise to a sweating of the metal because the face of the copper cake is not sufficiently solidified, and in order to overcome this sweating action and eliminate the air spaces between the cake and the mold walls the turnbuckles 33 and the tension rods 39 may be taken up or tensioned to draw the side walls up into intimate contact with the cast cake. By so doing, blistering on the face of the cake is avoided and the cast cake is produced with smooth surfaces. The cake after being cast may be removed from the mold by loosening the tensioning means 33 to 39 and by withdrawing the end blocks 12.

In Fig. 4 of the drawing I have diagrammatically shown a top plan view of an adjustable mold, which, by the use of one or more intermediate blocks 40, I am enabled to cast a plurality of metal cakes with a given pair of mold side blocks. The intermediate block 40 in all respects is quite similar to the end blocks 12 and may be positioned intermediate said end blocks any predetermined distance therebetween. For holding the intermediate block in desired relation with respect to the side blocks, holding means analogous to the reinforcing means (parts 34 to 39) may be employed and these may be suitably disposed at either side of the intermediate block, as shown in Fig. 4.

It will be appreciated that in view of the fact that each of the mold block elements have parallel, flat surfaces, either of said surfaces may be used as a boundary for a mold space, thus rendering the blocks both interchangeable and reversible. As herein shown, the end blocks 12 have their adjacent vertical faces of different widths, thus rendering them also adaptable for use in casting cakes of different thickness. It will thus be apparent that I have provided an adjustable mold capable of facile setup and change, wherein flat metal cakes of copper or other desirable metal of predetermined dimensions can be readily cast under conditions even more favorable than where integral molds are employed. An additional advantage of adjustable molds of the type described is that the particular mold elements or walls lend themselves for re-dressing when they become pitted or otherwise rendered unsuitable for use, thereby reducing the maintenance cost of the molds.

The forms of the invention as herein disclosed, although being preferred embodiments, are not to be considered as limiting the scope of the invention, since it will be apparent that the details of construction disclosed may be varied within the range of engineering skill without departing from the spirit of the invention as defined in the accompanying claims.

What I claim is:

1. A mold comprising a bed block having a flat top face, separate side blocks and separate end blocks having bottom flat faces in engagement with the top face of the bed block and independently adjustable thereon to provide a mold space, the end blocks each having a pair of parallel flat faces and the side blocks each having parallel flat faces for selectively engaging the parallel flat faces of the end blocks, means for holding the side blocks in contact with the end blocks and each of said blocks having passages therein for the circulation of fluid therethrough.

2. An adjustable setup mold for casting cakes of copper and the like of different sizes having a much greater width than thickness, comprising a bed block having a continuous flat top face, separate side blocks and separate end blocks having bottom flat faces in engagement with the top face of the bed block and independently adjustable thereon to provide a mold space, the end blocks each having a pair of parallel flat faces and the side blocks each having parallel flat faces for selectively engaging parallel flat faces of the end blocks, means for holding the side blocks in contact with the end blocks, means engageable across the outer faces of the side blocks intermediate the ends thereof and projecting above the top and below the bottom of said blocks and adjustable clamping means for tensioning the side block engaging means for applying pressure on the side blocks toward the mold space.

3. A mold comprising a bed block having a flat top face, separate side blocks and end blocks having bottom flat faces in engagement with the top face of the bed block and bodily adjustable thereon to provide a mold space, the end blocks each having a pair of parallel flat faces and the side blocks having inner flat faces for engaging the parallel flat faces of the end blocks, means at the ends of the side blocks for holding the side blocks in contact with the end blocks, said side blocks having passages therein for the circulation of fluid therethrough and means engageable with the outer faces of the side blocks intermediate the ends thereof for applying pressure on said side blocks toward the mold space.

4. An adjustable set-up mold for casting cakes of copper and the like of different sizes having a much greater width than thickness, comprising a bed block, side blocks and end blocks each having parallel flat faces, the side blocks and the end blocks being adjustably mounted on the bed block with the end blocks adjustably positioned between the side blocks, adjustable means for holding the faces of the side blocks and end blocks in engagement to provide a mold space and the adjacent faces on the end blocks being of different width whereby cakes of different thickness may be selectively cast by having one or the other pair of faces on the end blocks in contact with the side blocks.

5. An adjustable set-up mold for casting cakes of copper and the like of different sizes having a much greater width than thickness, comprising a bed block, side blocks, end blocks and an intermediate block, each of said blocks having parallel flat faces, the side blocks, end blocks and the intermediate block being mounted on the bed block with the intermediate block and the end blocks adjustably positioned between the side blocks, and means for holding the faces of the side blocks in engagement with the intermediate and end blocks to provide an adjustable multiple mold space.

WILLIAM F. EPPENSTEINER.